UNITED STATES PATENT OFFICE.

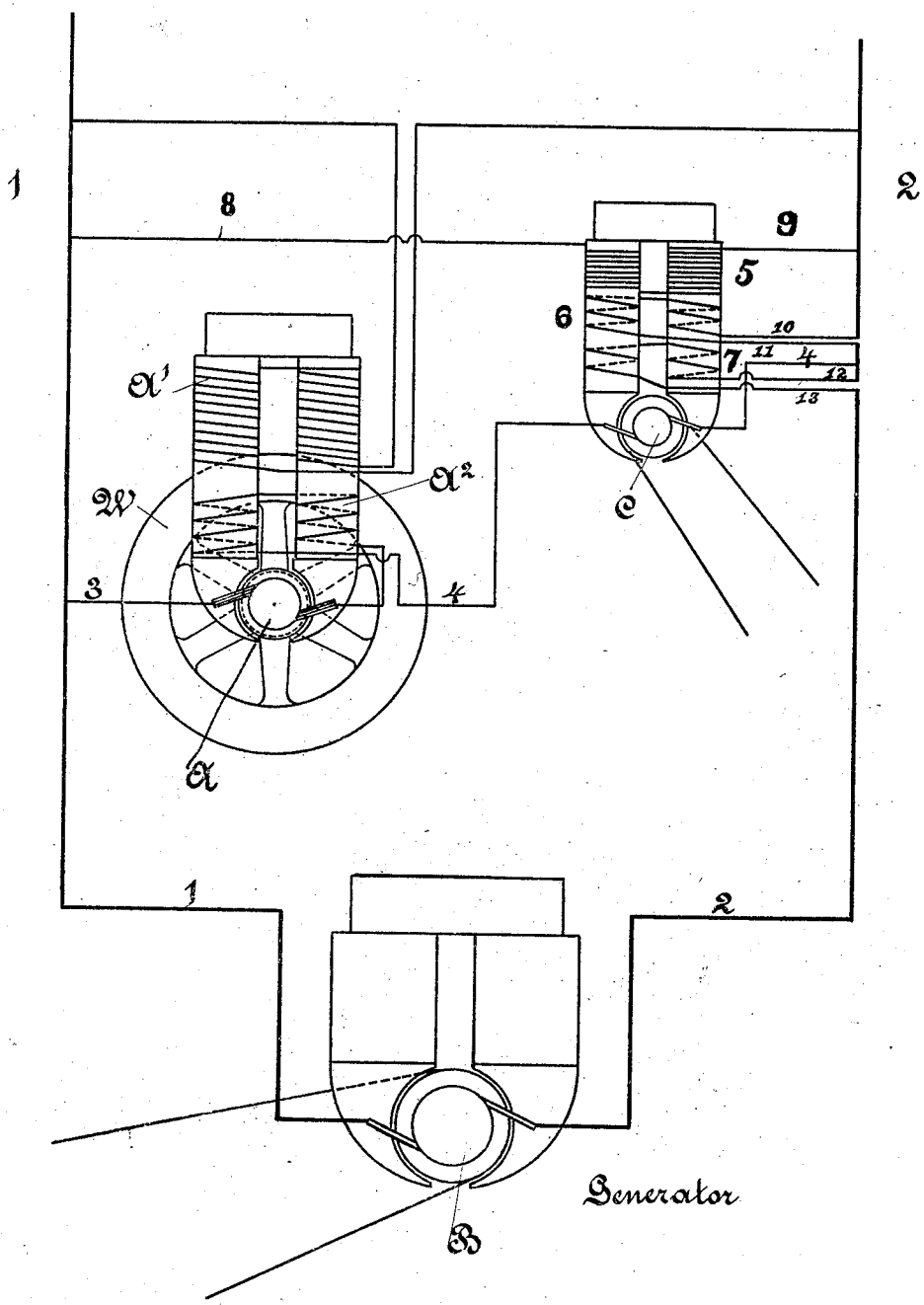

GEORGE A. WELLS, JR., OF NEW YORK, N. Y.

APPARATUS FOR THE REGULATION OF ELECTRIC SYSTEMS.

No. 821,909.     Specification of Letters Patent.     Patented May 29, 1906.

Application filed November 10, 1903. Serial No. 180,536.

*To all whom it may concern:*

Be it known that I, GEORGE A. WELLS, Jr., a citizen of the United States of America, and a resident of the city, county, and State of New York, have invented certain new and useful Improvements in Apparatus for the Regulation of Electric Systems, of which the following is a specification.

The object of my invention is to relieve electrical systems and apparatus from the widely-varying stresses incident to or caused by the changing demands of a fluctuating load—such, for instance, as exist in different degree in all systems for electric-power distribution of whatsoever nature.

Varying demands for power are perhaps most commonly manifest in electric-railway practice of the present day, and the following described improvements are applicable to such a system, although I do not confine my invention specifically to such use, as the principle is susceptible of being adapted to any electric circuit.

The gist of my invention resides in the employment of devices whereby under normal conditions the apparatus is electrically operated so as to acquire mechanical energy, which is reconverted into electric power as occasion demands. I employ in connection with such apparatus governing mechanism to increase the sensitiveness thereof, so that it may respond more readily to the demands upon it. Specifically, I prefer to use an electrodynamic or dynamo-electric machine provided with a fly-wheel or other considerable mass connected to a rotating part and in combination therewith a booster to increase its sensitiveness, and hence its speed of action, in adapting itself to the varying stresses of the system. This compensating machine is designed to run as a motor when the load is at its mean, and by reason of the attached mass or fly-wheel considerable momentum is acquired thereby. When the work becomes excessive or the supply of electric power diminishes, the acquired momentum causes the compensating machine to run as a dynamo. While the employment of the compensating machine alone might in itself materially aid the constancy of the power, the addition of the booster serves to assist its delicacy.

The nature, characteristic features, and scope of my invention will be more fully understood from the following description, taken in connection with the accompanying drawing, forming a part hereof, and in which I have illustrated diagrammatically certain apparatus embodying specific features of my invention.

In the drawing the main source of power is represented as a generator B, connected in the customary manner to the working or line conductors 1 and 2. The compensating electric machine A is arranged in parallel with the generator B by means of the line conductors 1 and 2 and the cross-conductors 3 and 4. This compensating machine A may be of any suitable or well-known character. As shown in the drawing, its field is provided with two coils A' and A², the first of which is connected to the line conductors 1 and 2, while the later is a series winding and is connected by the conductor 4 to the booster C, hereinafter to be referred to. The two coils oppose each other in varying degree, so that the motion is differential. The armature of the compensating machine is provided with a fly-wheel W to store mechanical energy in the form of momentum and subsequently to release it as electric energy.

In order to increase the efficiency of the compensating machine A and to act as a governor therefor, I employ a booster C in series therewith and in multiple with the generator B through the line conductors 1 and 2 and the cross-conductors 3 and 4, as plainly shown in the drawing. The booster may be of any desired form to secure the desired result—namely, to increase the sensitiveness of the compensating machine A and to act as a governor therefor, or, if desired, other equivalent apparatus might be substituted without departing from the spirit of my invention. As shown in the drawing, I have illustrated a form of booster similar to that presented in the Letters Patent to J. B. Entz, No. 625,098, May 16, 1899, the field of the said booster being so wound and connected to the main circuit as to render it respondent to the different conditions of load and supply.

As shown, the field of the booster is provided with coils 5, 6, and 7, the coil 5 being composed of comparatively fine wire of many turns, and the coils 6 and 7 are composed of comparatively few turns of coarse wire. The coil 5 is connected with the circuit so as to excite the field in one direction, and the coils 6 and 7 are connected with the circuit so as to excite the field in the opposite direction, so that the effect of coils 6 and 7 is to oppose the the effect of coil 5 in respect to magnetization of the field. The coils 6 and 7 are in series relation with respect to the conductor 2. However, one of them, 7, is led off from the conductor 2 on the generator side of the union of the compensating-electric-machine conductor 4 with the working conductor 2, and the other coil 6 is led off from the conductor 2 on the service side of the union of the compensating-electric-machine conductor 4 with the working conductor 2. The object of this arrangement will be presently described. The circuit for the coil 5 may be as follows: from conductor 1 by conductor 8, through coil 5, and by conductor 9 to conductor 2 on the service side of the union of the compensating electric machine with said working conductor. In this case the coil is connected across the compensating-electric-machine terminals. The path through the coil 6 may be described as from the conductor 2, by 10, through coil 6, by 11, back to conductor 2. The path from coil 7 may be described as by 12 through coil 7 and by 13 to conductor 2. Under certain conditions of load the coil 5 is balanced by the coils 6 and 7, so that the voltage of the booster may be represented as zero when the compensating electric machine, although in motion, is inert in its capacity as a regulator. In the event of an increased load in the service or working circuit the coil 6 by its action upon the field of the booster causes the latter to add its voltage to the compensating electric machine by the same amount as it tends to fall by reason of an increased delivery of energy equal in amount to the increase of load on the service-conductors. In the event of a decreased load in the service or working circuit the coil 5 overbalances the coil 6, and its action upon the booster deducts its voltage from the compensating electric machine to the extent that it will absorb energy from the generator equal to the decrease of load on the working circuit, and thus keep the load on the generator constant; but in order for the whole system to work constant and keep a constant load on the generator $b$ the voltage of the compensating electric machine must always rise or fall the same amount for a given increase or decrease in absorption or delivery of energy. In practice the change in voltage of a compensating electric machine for a given change in current depends upon whether the compensating machine is running above or below its normal speed. Therefore under all speed conditions of the compensating electric machine the coil 6 alone, in connection with the coil 5, would not effect the regulation required for keeping the load on the generator constant and causing the compensating electric machine to compensate for change of load. The coil 7 by its operation upon the field of the booster causes the latter to govern the voltage of the compensating electric machine by a change of current in the generator-circuit—that is to say, in the circuit of the working conductors on the generator side of the compensating-electric-machine conductors 3 4—so that if, due to imperfect regulation by the coil 6, an increase or decrease of load comes on the generator $b$ and must pass through the coil 7 an increase of current through the coil 7 operates to raise the voltage of the booster, and therefore tends to increase the discharge of the compensating electric machine, thereby reducing the increased load that would otherwise come on the generator. A decrease of current throughout coil 7 operates to decrease the voltage of the booster and compensating electric machine, and therefore tends to make the compensating electric machine take more current from the generator than it would otherwise do. The action of a change of current in the coil 7 is the same as in the coil 6. If the coil 6 works perfectly, the change in load on the working conductors is compensated by the variation in speed of the compensating electric machine, and no change of current occurs through the coil 7 or in the generator. By reason of changes in the condition of the compensating electric machine the compensation of coil 6 is frequently not sufficient and change of current does get back to the generator. Such current must pass through the coil 7, which thus adds its governing effect to that of coil 6 and causes the compensating electric machine to absorb and deliver energy and to keep the load on the generator constant. In order to govern the load on the generator by means of a single coil, such as 7, it would have to be of exceedingly large size in order to keep the load on the generator constant within reasonable narrow limits, because of a small change of current through it would have to produce the total regulating effect. However, to only correct imperfections of the coil 6, due to changes in the compensating-electric-machine condition, it need be of only moderate size. It will be obvious that the connection of such a booster or other governing device to the compensating machine A increases the delicacy of the latter and causes it to respond quickly to the various changes in the load equation.

The compensating machine A is constructed and wound to generate a counter electromotive force at its normal speed equaling approximately the normal voltage of the main circuit at the average load of the system. The fluctuations in load are assumed by the compensating machine A in substantially the following manner: When the relation of power to load is raised above the average, either by an increase in the former or by a decrease in the latter, or by both, the excess power through the medium of the booster acts immediately to increase the speed of the compensating machine, and the surplus energy thus available is stored there in the form of momentum by means of the attached fly-wheel. If now the relation of power to load be brought below the average, either by a decrease in the former or by an increase in the latter, or by both, the deficiency in energy in the main circuit is supplied by the counter electromotive force generated by the compensating machine, which is now run as a dynamo by the previously-stored momentum in the fly-wheel. It will thus be seen that the arrangement described tends to assume and regulate the fluctuations in the main circuit, and due to the connection of the governing apparatus or booster that the sensitiveness of the compensating machine is materially increased.

It will be obvious to those skilled in the art to which the invention appertains that many modifications may be made in details without departing from the spirit thereof. Hence I do not limit myself to the precise arrangement of parts hereinabove set forth, and illustrated in the accompanying drawing. For instance, my improvement is capable of employment in connection with any system of electric distribution however supplied or for whatever purpose intended. The compensating machine itself may be of different construction and arrangement and may or may not be provided with a fly-wheel, as the construction of the machine might be of such a character as to enable it to store power without additional means, or other devices may be used to store and preserve the surplus energy, and, as before stated, the booster may be of any convenient form, or it may be dispensed with entirely and other governing apparatus substituted therefor.

Having thus described the nature, construction, and operation of my invention, what I claim, and desire to secure by Letters Patent of the United States, is as follows:

1. In a system of electrical distribution, the combination of a generator adapted to supply the line conductors with the working current, a compensating electric machine adapted to store mechanical energy and release it subsequently as electric energy and connected with the line conductors, and a booster interposed in the connection between the said compensating electric machine and one of the line conductors.

2. In a system of electrical distribution, the combination of a generator adapted to supply the line conductors with the working circuit, a compensating electric machine adapted to store mechanical energy and to release it subsequently as electric energy, and connected in multiple with the generator, and a booster interposed in the circuit in series with the compensating electric machine.

3. In a system of electrical distribution, the combination of a generator adapted to supply the line conductors with the working current, a compensating electric machine in electrical connection with the line conductors, and adapted to store mechanical energy and subsequently release it as electric energy, and a booster provided with a shunt-field with approximately constant excitation, and provided further with one or more series windings opposed to the shunt-field and connected in the main circuit, said booster having its armature interposed in the electrical connection of the compensating electric machine with the main circuit.

4. In a system of electrical distribution, the combination of a generator adapted to supply the main circuit with the working current, a compensating electric machine embodying a rotary armature, adapted to store mechanical energy and subsequently release it as electric energy, and having its armature connected in multiple with the generator, and a booster provided with a shunt-field with approximately constant excitation, and a plurality of windings opposed to the shunt-field, and connected in series in the main current, said booster having its armature connected in series with the armature of the compensating electric machine.

5. In a system of electrical distribution, the combination with a generator, of compensating mechanism adapted to store mechanical work or energy and subsequently release it as electric energy, and a governing mechanism therefor, subject in its governing action to the variations of the working current, and adapted to generate electromotive force in accordance with said variations of current.

In witness whereof I have hereunto set my hand this 4th day of November, 1903.

GEORGE A. WELLS, Jr.

Witnesses:
M. E. BAIRD,
B. R. ANDREWS.